United States Patent [19]

Oda

[11] Patent Number: 5,411,445
[45] Date of Patent: May 2, 1995

[54] BALL CHAIN AND SPLICING MEANS THEREFOR

[75] Inventor: Kiyoshi Oda, Namerikawa, Japan

[73] Assignee: Yoshida Kogyo K.K., Tokyo, Japan

[21] Appl. No.: 36,286

[22] Filed: Mar. 24, 1993

[30] Foreign Application Priority Data

Apr. 9, 1992 [JP] Japan .................. 4-118370

[51] Int. Cl.$^6$ .................. F16H 7/02; F16G 11/09; F16G 11/02
[52] U.S. Cl. .................. 474/154; 474/203; 474/211; 474/243
[58] Field of Search .................. 474/154, 175, 203, 205, 474/211, 243; 59/85, 89, 95

[56] References Cited

U.S. PATENT DOCUMENTS

| | | | |
|---|---|---|---|
| 443,769 | 12/1890 | Hurford | 474/211 |
| 536,863 | 4/1895 | Fanning | 474/203 |
| 1,793,432 | 2/1931 | Austin et al. | 474/211 |
| 1,896,407 | 2/1933 | Hoeffleur | 474/211 X |
| 2,066,852 | 1/1937 | Plummer | 474/211 |
| 2,577,046 | 12/1951 | Svirsky | 474/154 X |
| 3,145,576 | 8/1964 | Proctor | 474/211 |
| 3,838,619 | 10/1974 | Brotman et al. | |
| 4,214,488 | 7/1980 | Conrad | 474/154 X |
| 4,962,847 | 10/1990 | Pisors et al. | 474/154 X |

FOREIGN PATENT DOCUMENTS

| | | |
|---|---|---|
| 62-182992 | 11/1987 | Japan. |
| 93379 | 1/1960 | Netherlands. |
| 2188261 | 9/1987 | United Kingdom. |
| 2192819 | 1/1988 | United Kingdom. |

*Primary Examiner*—Roger J. Schoeppel
*Attorney, Agent, or Firm*—Hill, Steadman & Simpson

[57] ABSTRACT

A ball chain for interior decoration, sprocket drive or the like which includes a connecting mechanism in the form of a wire or yarn, a multiplicity of chain balls secured in place at equally spaced intervals along a length of the connecting mechanism, and a coupling interposed between adjacent chain balls. A splicing mechanism provided for splicing the ball chain includes a socket having a cavity dimensioned to receive the coupling.

6 Claims, 2 Drawing Sheets

FIG. 6
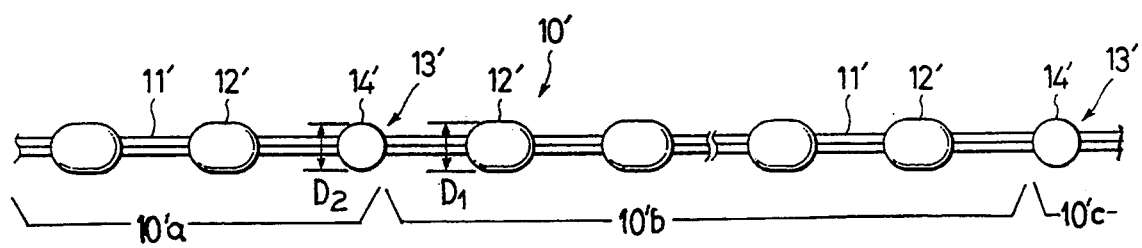
FIG. 7    FIG. 8
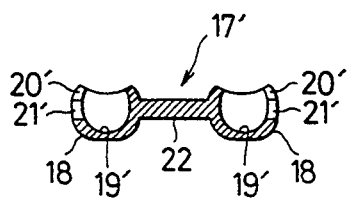   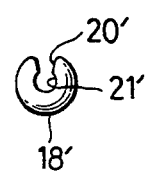
FIG. 9
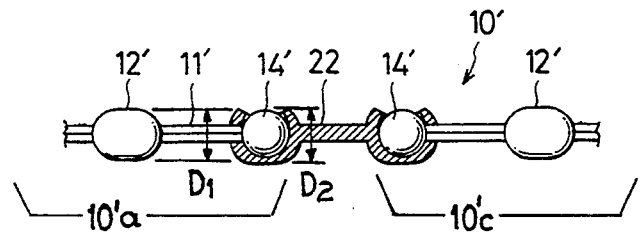

BALL CHAIN AND SPLICING MEANS THEREFOR

BACKGROUND OF THE INVENTION

FIELD OF THE INVENTION

This invention relates to a ball chain having a multiplicity of spaced interconnected balls; The invention is also directed to the provision of a splicing means for splicing such a ball chain. Prior Art There are known many types of ball chains for use as ornamental parts and accessories associated with building interiors or as sprocket chains. Typically, they are in the form of a chain of a predetermined loop length comprising hollow metallic balls interconnected in equi-distantly spaced apart relation by means of connecting wires or textile yarns, or balls of a plastics material injection-molded onto a textile yarn or string at equal intervals along its length. Apart from these ball chains of limited lengths, there are also known such ball chains of a substantially endless length which are designed to be cut to desired individual product lengths and spliced together to suit a particular application.

It is a conventional practice to sever one of the plastic balls in an endless chain at each of opposite ends of a length thereof into identical halves and join together the two corresponding halves at the respective ends by means of an adhesive compound. This conventional splicing method has a drawback in that it requires a cutting device to sever the balls and a holding device to hold the balls during glueing in most cases at the site of installation where the ball chains are applied for example for interior decoration. Furthermore, with hollow metallic balls, it is difficult to splice without deformation by cutting pressure.

Another means of splicing a ball chain is disclosed in Japanese Laid-Open Utility Model Publication No. 62-182992 in which a ball chain is cut to a predetermined length across bulged ends of a connecting string interconnecting individual balls at equal intervals and injection-mold a new ball onto such bulged ends of the string. Such ball chain are mostly factory-produced with specified limited lengths which are not always in conformity with a particular desired end use in a building interior.

SUMMARY OF THE INVENTION

With the foregoing drawback of the prior art in view, the present invention seeks to provide an elongate ball chain having a multiplicity of balls, metallic or plastic, at substantially equal intervals (a ball-to-ball spacing or pitch) along a desired spliced length.

The invention also seeks to provide a splicing means for splicing a ball chain.

These objects and features of the invention will be better understood from the following detailed description taken with reference to the accompanying drawings which illustrate by way of example some preferred embodiments.

According to one aspect of the invention, there is provided a ball chain comprising a connecting means, a multiplicity of chain balls secured in place at substantially equally spaced intervals along a length of the connecting means, and a coupling means secured to the connecting means at predetermined intervals therealong and interposed equi-distantly between adjacent balls.

According to another aspect of the invention, there is provided a splicing means for splicing a ball chain comprising a connecting means, a multiplicity of chain balls secured in place at substantially equally spaced intervals along a length of the connecting means, and a coupling means secured to the connecting means at predetermined intervals therealong and interposed equi-distantly between adjacent balls, the splicing means comprising a socket dimensioned and configured substantially to conform peripherally with the ball chain and provided with a cavity dimensioned to receive the coupling means and openings communicating with the cavity for inserting the connecting means therethrough.

BRIEF DESCRIPTION OF THE DRAWINGS

FIG. 6 is a partial plan view of a modified form of ball chain according to the invention shown prior to splicing;

FIG. 7 is a cross-sectional view of a splicing means adapted to splice the ball chain of FIG. 6;

FIG. 8 is a side elevation of the splicing means of FIG. 7; and

FIG. 9 is a partial plan view of the ball chain of FIG. 6 shown in spliced condition.

Like or corresponding reference numerals are used to refer to like or corresponding parts throughout the several views.

DETAILED DESCRIPTION OF THE INVENTION

Figure 1:
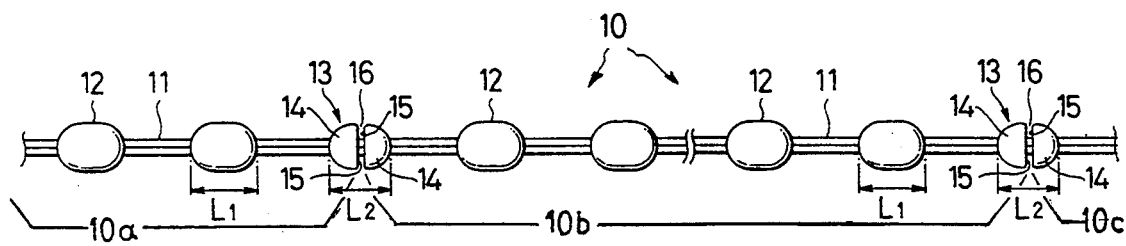
FIG. 1 is a partial plan view of a ball chain embodying the invention shown prior to splicing.
Figure 2:
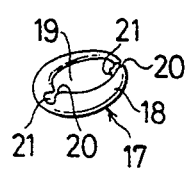
FIG. 2 is a perspective view of a splicing means comprising a metallic splicing element embodying the invention.
Figure 5:
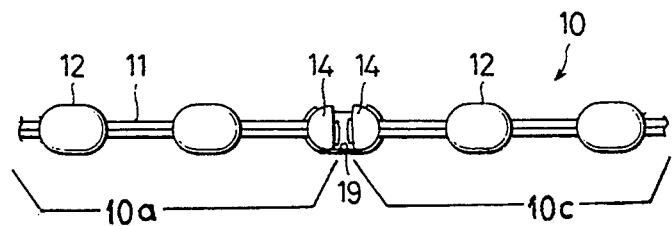
FIG. 5 is a view similar to FIG. 1 but showing the ball chain in spliced condition.

Referring now to the drawings and firstly to FIGS. 1 and 5 there is shown a ball chain 10 provided in accordance with a first embodiment of the invention which comprises a connecting means 11 in the form of a pair of wires or yarns and a multiplicity of generally oval balls 12 of a plastics material secured in place at substantially equally spaced intervals along a length of the connecting means 11. The balls 12 are secured to the connecting means 11 conveniently by injection-molding. Alternatively, the balls 12, if made of a metallic material, may be clamped onto the connecting means 11 in a manner well known in the art.

Designated at 13 is a coupling means secured to the connecting means 11 at predetermined intervals therealong and interposed equi-distantly between adjacent balls 12 and assuming an oval shape similar to but smaller in size than each ball 12. The coupling means 13 is located at a distance from each adjacent ball 12 equal to the distance between balls 12. The coupling means 13 comprises a pair of plastic semispherical balls or elements 14, 14 having their respective ellipsoidal surfaces 15, 15 confronting with each other across a small gap 16 through which the connecting means 11 is exposed to view. The coupling means 13 has a longitudinal length $L_2$, as measured with the two semispherical elements 14, 14 combined, including the gap 16, the length $L_2$ being smaller than the longitudinal length $L_1$ of each ball 12 as shown in FIG. 1. However, this length relation may be $L_1 = L_2$.

Figure 3:
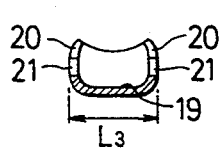
FIG. 3 is a cross-sectional view of a splicing means comprising plastic splicing element similar in construction to the metallic element of FIG. 2.
Figure 4:
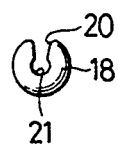
FIG. 4 is a side elevation of the splicing element of FIG. 3.

Designated at 17 and better shown in FIGS. 3 and 4 is a splicing means comprising a generally oval socket 18 dimensioned and configured substantially to conform peripherally with each of the balls 12 and provided with a cavity 19 dimensioned to fit with and receive the coupling means 13. The socket 18 has on opposite ends thereof outwardly diverging openings 20, 20 communicating with the cavity 19 for inserting the connecting means 11 therethrough and anchoring grooves 21 merging with the openings 20 for anchoring the connecting means 11 when the coupling means 13 is received into the socket 18 as shown in FIG. 5.

In the splicing operation according to the invention, the ball chain 10 is cut across the portion of one of the connecting means 11 which lies in the gap 16 between the paired semispherical coupling elements 14, 14 with use of a knife or scissors where the connecting means 11 is made of a textile yarn, or with use of a saw where the connecting means 11 is of a metallic wire, whichever the case may be, thereby separating the two halves 14, 14 of the coupling means 13 and separating the chain at sections 10a and 10b. The ball chain 10 is further similarly cut at another coupling means 13 at sections 10b/10c spaced remotely from previously cut counterpart 13 by such a distance corresponding to section 10b which determines an ultimate desired length of each individual ball chain in finished loop form by connecting coupling elements 14 to each other at opposite ends. Mating ones of the thus separated coupling elements 14, 14 at opposite ends of the ball chain 10 are placed into the cavity 19 of the splicing means 17 with the connecting means 13 inserted through the openings 20 and anchored in the grooves 21 as shown in FIG. 5, in which instance if the connecting means 13 is loosely anchored or the coupling elements 14, 14 are freely movable within the cavity 19, it is advisable to secure these parts firmly together by means of for example a suitable adhesive agent.

Since the splicing means 17 has substantially the same oval peripheral configuration and substantially the same longitudinal length $L_3$ as each of the balls 12, the ball chain 10 can be successfully used also as a chain for a sprocket drive.

FIGS. 6 through 9, inclusive, illustrate a modified embodiment of the invention in which a ball chain 10' is provided with a coupling means 13' comprising a substantially spherical ball or element 14' contrastive to an oval ball 12 and smaller in diameter than a chain ball (12'). These spherical coupling elements 14' are interposed between adjacent balls 12' at desired intervals along the length of the ball chain 10' as in the case of the previously described embodiment.

A splicing means 17' comprises a pair of spaced generally spherical sockets 18', 18' interconnected by a bridging member 22 formed from a resilient material. Each of the sockets 18', 18' has a cavity 19', outwardly diverging openings 20', 20' and an anchoring grooves 21', all of these socket parts having substantially the same or similar construction and function as their counterparts described in connection with the first embodiment, hence requiring not further explanation.

When splicing the ball chain 10', the connecting means 11' is cut close at either end of one or first ball coupling element 14' at a selected position on the ball chain 10' causing a separation at sections 10'a and 10'b and also at the opposite end of another or second coupling element 14' at another selected position causing a separation at sections 10'b and 10'c spaced apart from the first coupling element 14' by a distance corresponding to section 10'b determining a desired length of a finished loop chain, and the first and second coupling elements 14', 14' are then received into the respective sockets 18', 18' and secured in place on the ball chain 10' as shown in FIG. 9.

Obviously, various modifications and variations of the present invention are possible in the light of the above teaching. It is therefore to be understood that within the scope of the appended claims the invention may be practiced otherwise than as specifically described.

What is claimed is:

1. A splicing means for splicing a ball chain having a connecting means, a multiplicity of chain balls secured in place at substantially equally spaced intervals along a length of said connecting means, a plurality of coupling means each secured to said connecting means at predetermined intervals therealong and interposed equi-distantly between adjacent balls, said splicing means comprising:

a socket dimensioned and configured having an outside length and width substantially equal to one of said chain balls, and provided with a cavity dimensioned to receive one of said coupling means and openings communicating with said cavity for inserting said connecting means therethrough.

2. A splicing means for splicing a ball chain having a connecting means, a multiplicity of chain balls secured in place at substantially equally spaced intervals along a length of said connecting means, and a plurality of coupling means, each comprising a spherical ball and secured to said connecting means at predetermined intervals therealong and interposed equi-distantly between adjacent chain balls, said splicing means comprising:

a pair of spaced and separate spherical sockets interconnected by a flexible strand-like bridging member, each of said spherical sockets having a cavity dimensioned to receive one of said spherical balls and openings communicating with said cavity for inserting said connecting means therethrough.

3. A ball chain comprising a connecting means, a multiplicity of chain balls secured in place at substantially equally spaced intervals along a length of said connecting means, and a plurality of coupling means each secured to said connecting means at predetermined intervals therealong and interposed equi-distantly between adjacent balls;

wherein each of said chain balls is substantially oval in shape; and wherein each of said coupling means is a pair of identical semi-spherical balls having their respective ellipsoidal surfaces confronting with each other across a gap through which said connecting means is exposed to view.

4. The ball chain according to claim 3, wherein said coupling means is distanced from each adjacent chain ball by a distance equal to said equally spaced intervals between chain balls.

5. A ball chain comprising a connecting means, a multiplicity of chain balls secured in place at substantially equally spaced intervals along a length of said connecting means, and a plurality of coupling means each secured to said connecting means at predetermined intervals therealong and interposed equidistantly between adjacent balls;

wherein said chain ball is substantially oval in shape; and wherein each of said coupling means is a spherical ball smaller in diameter than each of said chain balls.

6. The ball chain according to claim 5, wherein said coupling means is distanced from each adjacent chain ball by a distance equal to said equally spaced intervals between chain balls.

* * * * *